United States Patent [19]

Blau, Jr. et al.

[11] Patent Number: 4,522,333
[45] Date of Patent: Jun. 11, 1985

[54] SCHEDULED HOT WATER HEATING BASED ON AUTOMATICALLY PERIODICALLY ADJUSTED HISTORICAL DATA

[75] Inventors: Frederick Blau, Jr., Fountain Valley; John M. Gross, San Jose; Tom R. Vandermeyden, Norwalk, all of Calif.

[73] Assignee: Fluidmaster, Inc., Anaheim, Calif.

[21] Appl. No.: 532,665

[22] Filed: Sep. 16, 1983

[51] Int. Cl.³ .............................................. F23N 1/08
[52] U.S. Cl. ................... 236/20 R; 236/46 A; 236/46 F; 364/505
[58] Field of Search ............... 62/231, 59; 236/46 F, 236/46 R, 46 A, 20 R, 46 C; 126/362; 364/505

[56] References Cited

U.S. PATENT DOCUMENTS 4,292,811 10/1981 Kamejima et al. ................. 62/59

FOREIGN PATENT DOCUMENTS 49648 4/1980 Japan ................................ 62/231

*Primary Examiner*—Henry Bennett
*Attorney, Agent, or Firm*—George E. Schick

[57] ABSTRACT

A conventional hot water heating system generally of the type for heating water in multiple units of hotels, motels and the like and using any heating medium has a processor and control assembly operationally connected to at least a heating control means, a water temperature sensing means and a water flow sensing means thereof. The processor and control assembly divides the time into exact time periods, say one-half hour, and the time periods are grouped into a group of consecutive time periods, say a week. Taking any individual time period, a directly preceding time period is checked with the same time period in the preceding group of time periods and if the two match within a given degree, the assembly adopts all of its settings from its particular time period a week ago. In addition, the assembly exactly records the various settings throughout that particular time period and when that time period comes up again one week from now, those are the new settings by the processor and control assembly to be used. Still further, at any time in a time period that high hot water flow from the water tank is detected by the water flow sensing means and the heating control means has not yet begun to begin heating more hot water, the water flow will immediately turn on the heating control means to thereby eliminate needless delays in the heating of water. By the heating of water in the manner described, therefore, the maximum water temperature can always be maintained at a minimum and there is still relative assurance of a hot water supply at all times.

32 Claims, 11 Drawing Figures

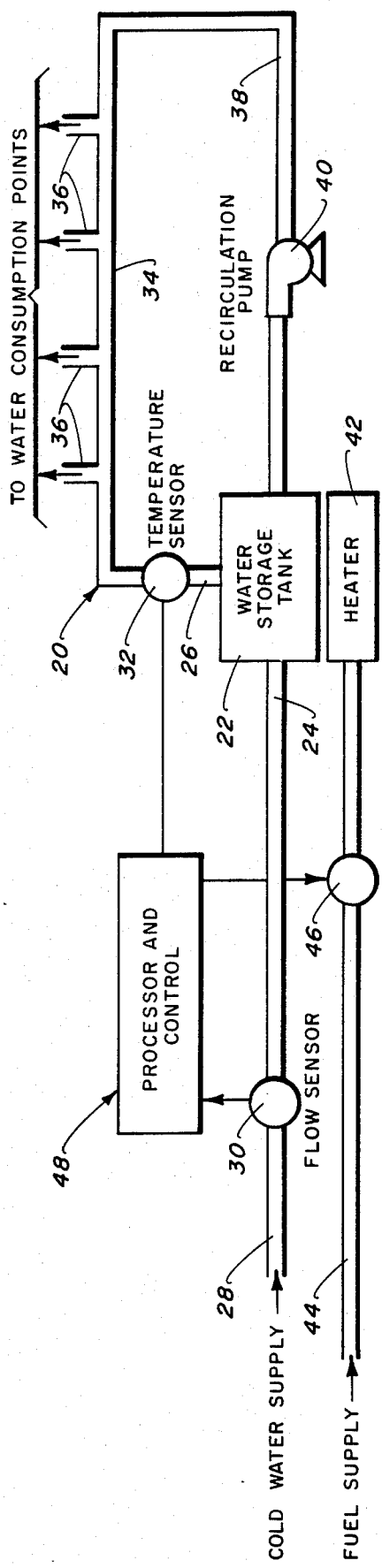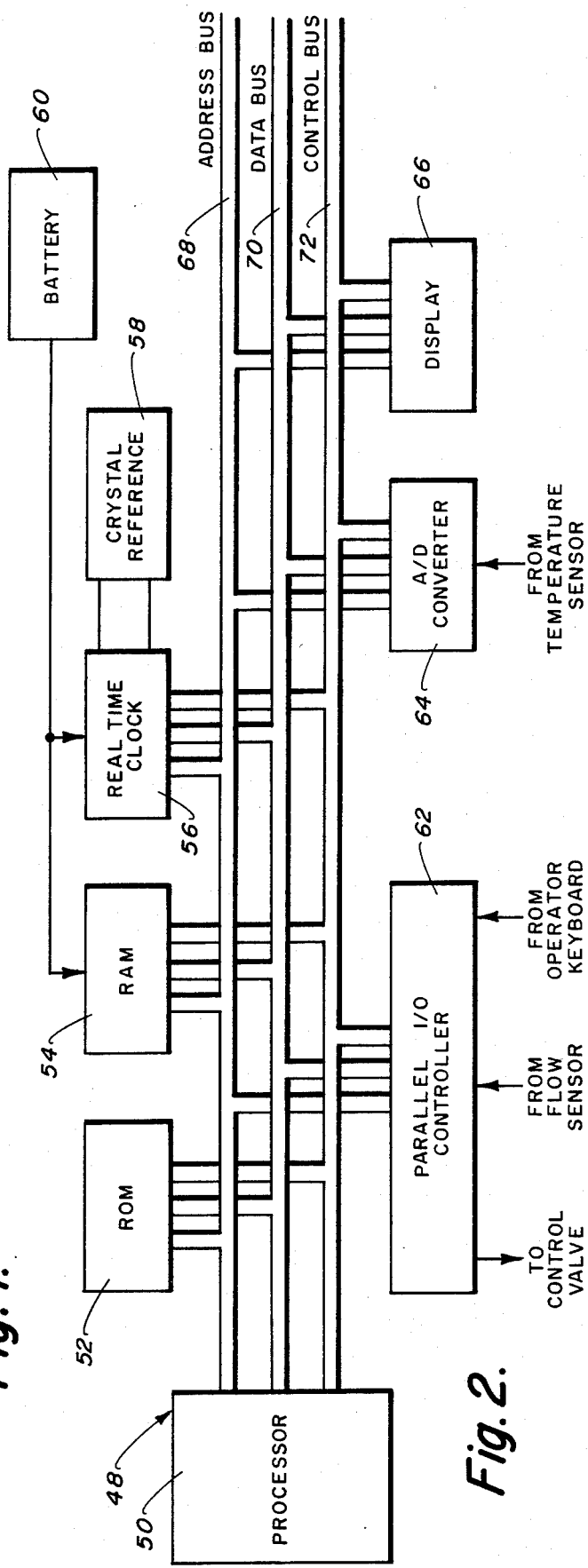

SCHEDULED HOT WATER HEATING BASED ON AUTOMATICALLY PERIODICALLY ADJUSTED HISTORICAL DATA

BACKGROUND OF THE INVENTION

This invention relates to a hot water heating system, and more particularly, to such a hot water heating system having marked improvements therein providing it capable of vastly improved and constantly upgraded efficiency over an indefinite period of time. In general terms, the usual components of hot water heating systems are integrated with a preferred electronic processor and control assembly, and are arranged for determined equal time period control based on the control resulting from a previous repeat of that same time period. Starting with that as a basis for the present time period, the actual use of the various energy is still exactly recorded during its present time period use, so that each particular time period as it is carried out is continuously upgraded for accuracy to be used in the next and further uses thereof. The overall result is that the maximum water temperature for any given time period may be safely maintained at its own determined level, usually lower, which takes into account the normal maximum amount of hot water to be used as determined by previous carrying out of that same time period, thereby increasing the overall efficiency of the hot water heating system.

The hot water heating system improvements of the present invention are perfectly applicable to various types of hot water heating systems and for many uses. However, the principles of the present invention have particular advantageous use in the heating of hot water for use in hotels, motels and the like. Thus, the principles of the present invention are illustrated herein in a typical hotel or motel setting, although the other uses thereof should be kept in mind.

Referring to, say, a typical motel, as presently constituted, the hot water heating system would involve at least one water storage tank having water enclosed therein and heated by any one of natural gas, elelctricity, all or one of the other heating fuels. The cold water supply is directed to the tank inlet, through the tank and through the tank outlet into the motel water supply system. Furthermore, the now heated water is directed to a multiplicity of motel units which could range from a few to a relatively large number.

The heating in the water storage tank is arranged so that the maximum temperature limit is, say, 145 degrees and the minimum limit is relativeley close, say, 140 degrees. The water enters the motel water supply system at the supply temperature of approximately 65 degrees and enters the water storage tank for being heated to the maximum of 145 degrees. As the heated hot water is used or merely through normal heat losses, it reduces to 140 degrees and the heating means is automatically turned on to once again heat the water to its maximum of 145 degrees.

It is clear, therefore, that with the common, modern-day water heating systems as used by hotels and motels as hereinbefore discussed, the water heating systems operate within very close limits and are constructed to maintain the hot water as near as possible to the maximum of 145 degrees, the heating means turning on at a low of 140 degrees to once again bring the water temperature up to the 145 degree limit. Furthermore, this temperature is maintained at all times wihout regard as to the hour of the day or night. It can be seen, therefore, that this modern heating system used by most hotels, motels and similar is quite inefficient in that a large loss in energy results. It is obvious that the energy needs for heating the water as determined by actual use vary considerably over any 24-hour period, yet with these modern-day arranagements, the systems remain constant and although various attempts have been made at improvements, none have been truly successful until the present invention.

OBJECTS AND SUMMARY OF THE INVENTION

It is, therefore, an object of this invention to provide a hot water heating control system which makes use of the normal components of hot water heating systems combined with a process and control means wherein the process and control means controls certain of the components for maintaining the water heated to a given temperature sufficient to meet the hot water needs at that particular time period, while still keeping the water temperature sufficiently low so as to be heated on an efficient basis, again, taking into account the hot water needs for that particular time period. For instance, in a preferred embodiment form thereof, assume the days are broken up into one-half hour periods and a complete week makes up a total group of time periods so that the next week would start a repeat. During each of these one-half hour time periods, a complete record is maintained so that in the next week, when this particular time period arrives, the proper total maximum water temperature and total amount of water can be reasonably predicted. Furthermore, each week is a new group of time periods and the time periods thereof are revised based on the immediately preceding group so that the individual time periods are continuously upgraded in order to maintain a reasonable degree of accuracy.

It is a further object of this invention to provide a hot water heating control system of the foregoing general character which further, where appropriate, may have an automatic history repeat inquiry at commencement of each of the time periods, the history repeat inquiry comparing the directly preceding time period and that same time period in the directly preceding group of time periods. If the amount of difference between the two time periods being compared is not within a particular percentage, this means that the history chain is not repeating itself for the next time period and the settings for this following time period are set to a particular maximum. If the amount of difference between the two time periods is within said particular percentage, this means that history is repeating and the history for this following time period is used directly for setting this following time period, thereby resulting in a marked increase in efficiency and a resulting cost savings.

It is still a further object of this invention to provide a hot water heating control system of the foregoing general character which further, under certain circumstances using particular hot water heating systems, may include means for anticipating the requirement of hot water heating ahead of the actual positive need therefor as measured by other components and turning on such hot water heating on an immediate basis, thereby eliminating the danger of a lack of proper hot water as can result in the certain hot water heating systems. Certain of the prior hot water heating systems have internal temperature controls therein which can eliminate at least certain of the water heating problems since they can sense, on a relatively early basis, the use of the hot water. However, these internal temperature control systems are subject to "stacking", that is, if the system is to sit idle for a reasonable period of time without hot water use therefrom, the hot water tends to rise forcing cold water downwardly and causing the outlet water temperature to become inordinately high. This is cured in systems of the present time by controlling hot water temperature at the tank outlet or delivery end, but unless more is done, nearly all of the hot water in the tank can be used prior to the commencement of any replacement hot water heating. Thus, where circumstnces dictate, a water inlet flow sensor is used to immediately detect the commencement of at least a relativeley rapid water inlet flow at the storage tank inlet and upon said rapid flow detection, immediately begin the heating of water and continue to do so until such control is taken over by the normal outlet control or water flow discontinues. This, therefore, insures proper water heating at all times and still with maximum efficiency.

Other objects and advantages of the invention will be apparent from the following specification and the accompanying drawings which are for the purpose of illustration only.

BRIEF DESCRIPTION OF THE DRAWINGS

FIG. 1 is a schematic view of a typical hot water heating system incorporating the processor and control improvements of the present invention;

FIG. 2 is a schematic view showing the processor and control of FIG. 1 in greater detail;

DESCRIPTION OF THE BEST EMBODIMENT CONTEMPLATED

Figure 3:
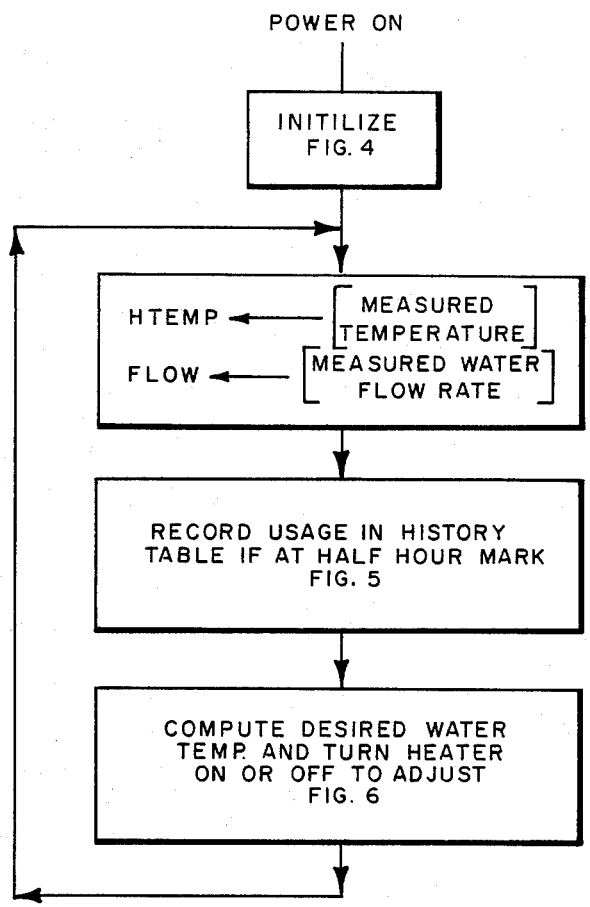
FIG. 3 is a flowchart showing the overall sequence of operation including an initialize block, a sensing usage block, a record usage in history block, and a compute desired temperature block, all according to a preferred embodiment thereof.

Referring to the drawings and particularly FIG. 1 thereof, a preferred embodiment of a typical hot water heating system generally indicated at 20 is shown schematically therein incorporating the processor and control improvements of the present invention as will be described below in detail. Furthermore, although the improvements of the present invention are beneficial in a large array of hot water heating systems for many uses, the present hot water heating system 20 is designed for use in heating hot water for hotels, motels and apartments. Still further, as is quite common in hot water heating systems, the water to be heated enters the particular tank at the lower portion thereof and leaves the tank at the upper portion thereof.

The hot water heating system 20 includes a water storage tank 22 with a lower water inlet 24 and an upper water outlet 26, all adapted to usual form. The water inlet 24 receives a cold water supply 28 through a water flow sensor 30 into the water inlet for ultimate heating in the water storage tank 22. The heated water leaves the water storage tank 22 through the water outlet 26 and through a water temperature sensor 32 into a water distribution system 34. The water distribution system 34 will normally have a multiplicity of water consumption points 36 around the length thereof moving away from the water storage tank 22 with these water consumption points representing units or rooms where the hot water is consumed. If the length away from the water storage tank 22 is quite short, then a recirculation line is not required, but as here, where the water distribution system 34 extends over 50 feet, a recirculation line 38 with an electrically driven recirculation pump 40 direct the circulating hot water back to the water storage tank 22 to join back into the water distribution system 34 as will be discussed hereinafter in more detail.

The heating of the water in the water storage tank 22 is accomplished by any conventional form of heating means, in this case, a heater 42 which receives any conventional form of fuel from a fuel supply 44 and through the heating control means or, in this case, a fuel control valve 46 to the heater 42. As stated, this heater 42 portion of the hot water heating system 20 may be of any form, the purpose of which is to heat the water within the water storage tank 22 by the use of energy in the form of heat. Natural gas or other wellknown gasses could be used, for instance, resulting in a combustion conversion to British thermal units or BTUs, or electrical energy could be used converting to kilowatt hours or KWH and ultimately into BTUs. The important point is that whatever energy or fuel is used for heating the water in the water storage tank 22, this energy is converted into usage which, in turn, ultimately gives the proper comparison for measuring the ultimate efficiency and cost.

To generally complete the hot water heating system as shown schematically in FIG. 1, a processor and control assembly generally indicated at 48 is shown operationally connected to the water flow sensor 30, the water temperature sensor 32 and the heating control means in the form of the fuel control valve 46. A more detailed schematic view of the processor and control assembly 48 is shown in FIG. 2 and includes a processor 50, a read only memory or ROM 52, a random access memory or RAM 54, a real time clock 56 having a crystal reference 58 and an emergency battery 60. The processor and control assembly 48 is completed by a parallel input/output controller 62, an analog to digital converter 64 and a display 66, all interconnected by an address bus 68, a data bus 70 and a control bus 72.

Generally, the processor 50 is constructed and arranged for executing the particular program which is stored in the ROM 52 and the ROM is used to store the particular program indefinitely. The RAM 54 is used to changeably store the history as will be discussed and the various parameters as will be discussed with the real time clock 56 being used to maintain time for the history recording purposes. The crystal reference 58 maintains the accuracy of the real time clock 56 and the battery 60 provides power to the RAM 54 and the real time clock 56 in the event of a power failure. The battery 60 allows the processor 50 to continue operation when power is reestablished as before the power failure since the only information that is lost as a result of the power failure is the historical usage during the time that the power is off.

The parallel I/O controller 62 is for input and output of digital signals, the output to control the fuel control valve 46 as to on and off, the input from the water flow sensor 30 to measure flow rate from pulse frequency, and the input from the operator keyboard to sense pressing of a particular key by the operator. The analog to digital converter 64 is for converting the analog signal from the water temperature sensor 32 to a digital value which is usable by the processor 50. The display 66 is to allow inspection of the various parameters such as the flow rate and temperature measured by the processor 50 from its various sensors. The display also shows the maximum and minimum allowable temperatures which are parameters that are entered by the operator through the operator keyboard.

The basic use of the apparatus of FIGS. 1 and 2 is shown generally in FIG. 3, and in greater detail in FIGS. 4, 5 and 6, FIGS. 3 through 6 all constituting flowcharts. Furthermore, there are several special terms used in the various flowcharts and in other flowcharts to be later described. These are set forth below, along with an illustration of compatible terminology which can be used.

TMAX—this is a temperature variable that contains the maximum allowable temperature which is set by the operator when the system is installed. As all temperatures, it may be degrees Fahrenheit. TMIN—this is the same only the minimum allowable temperature is set by the operator when the system is installed. HTEMP—the processor 50 stores this temperature of the hot water in this variable.

ONE-HALF HOUR—these are the selected consecutive time periods. ONE WEEK—these are the groups of consecutive time periods. Each one week group is 336 consecutive time periods and each week starts a new group. These would be expressed in seconds, minutes, hours and so forth.

FLOW—the processor 50 stores the rate of cold water flow into the water storage tank 22 in this variable. Gallons per minute is used and is normalized to a maximum of one for convenient use by the processor and control assembly 48. USAGE—this is a variable used to accumulate the energy usage during a one-half hour consecutive time period, that is, the number of gallons raised by the degrees raised and the energy required, all normalized to a maximum of 100 K. XUSAGE—this is a variable expressed in the same manner which the processor stores and is the historical usage from a one-half hour consecutive time period from one week and one-half hour ago.

HISTORY (1 through 336)—this is an array or table of variables which may be referred to where the parameters within the above parentheses specify a particular variable or a particular one-half hour consecutive time period within the one week group of consecutive periods. HOUR—this is a module which may be referred to within the 336 variables, one of the consecutive time periods within the group of consecutive time periods and is used as a pointer in the history table. DTEMP—this is delivered temperature and the processor 50 stores the desired hot water temperature in this variable, the processor determining the desired value based on TMAX, TMIN, FLOW and HISTORY.

The flowchart of FIG. 3 is the highest level flowchart and serves as an overview of the control method. When the power is turned "on" to the device, the block INITIALIZE determines the integrity of the battery backed-up memory and clears or sets variables as required. In the next block, the temperature of the hot water and the rate of flow of cold water into the water storage tank 22 are measured. In the RECORD USAGE BLOCK, the processor 50 accumulates the flow and temperature data and at half-hour intervals, the one-half consecutive time periods, records the total into the HISTORY table. The next block, COMPUTE DESIRED TEMPERATURE, the processor 50 determines what the ideal temperature should be at the present moment based on several parameters as described in FIG. 6. Finally, the processor 50 compares the desired temperature with the actual temperatures measured above, and turns the heater 42 "on" or "off" to bring the actual temperature closer to the desired temperature. The sequence of the latter three of the above blocks is then repeated indefinitely, or until a power failure.

Figure 4:
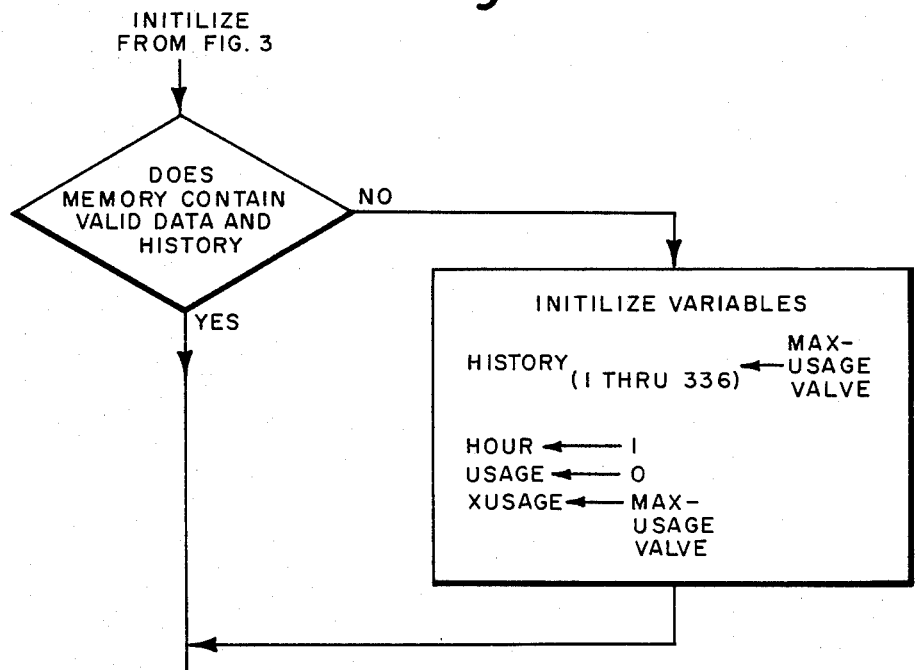
FIG. 4 is a flowchart taken from FIG. 3 and showing the record usage block in greater detail.

More particularly, with the flowchart of FIG. 4, assume that the processor 50 has just been installed. In the decision block DOES MEMORY CONTAIN VALID DATA AND HISTORY, the processor 50 tests the memory using a checksum method. If the checksum is good, the processor 50 continues to FIG. 3, but if a bad checksum results, which it must here, the processor 50 fills the entire HISTORY table with a maximum usage value to indicate that the usage for the last week was always at maximum. The net effect is that further computations will set the desired temperature to maximum for the first week of operation. This is desirable since usage requirements will not be predictable for the first week due to there being no actual history recorded. The processor 50 then continues as per FIG. 3.

Figure 5:
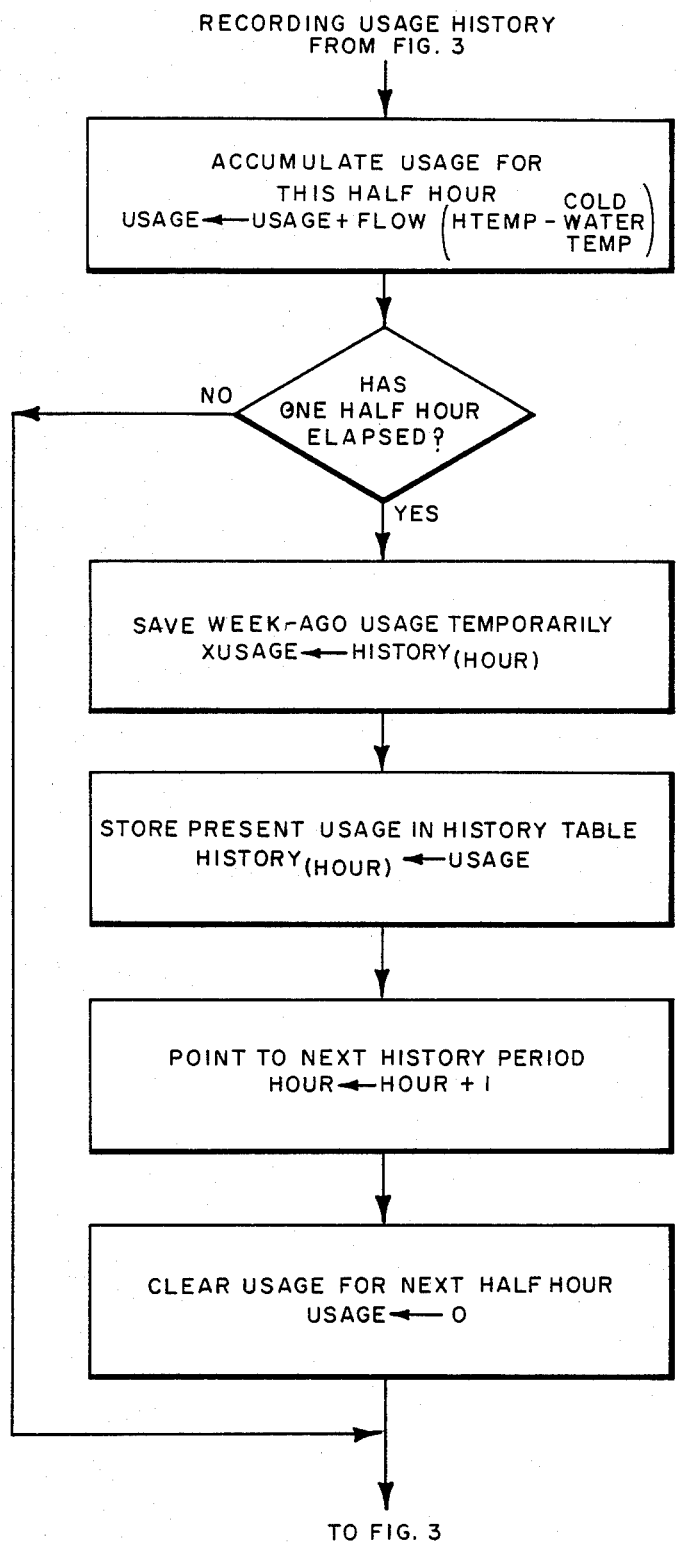
FIG. 5 is a flowchart taken from FIG. 3 and showing the history block in greater detail.

The next block of FIG. 3 is the RECORD USAGE IN HISTORY TABLE and is detailed in FIG. 5. The objective of the flowchart here is to show how the USAGE is computed, and when and where it is stored in the HISTORY table. In the first block, the FLOW and HTEMP of the water as found in FIG. 3 is used to compute the USAGE for that time period, however, keep in mind that here the time period is the time period the processor 50 spends for each cycle through the repeated three blocks of FIG. 3 and this time will be less than one second.

The USAGE is the energy delivered during the time period. In other words, it is the work done by the water heater 42 and this work is determined by the quantity of water delivered multiplied by the increase in water temperature caused by the water heater. The equation is USAGE in one time period=FLOW times the difference of HTEMP minus the cold water temperature. The equation in the first block of FIG. 5 describes this accumulation of this USAGE for each time period.

The next block in FIG. 5, HAS ONE-HALF HOUR ELAPSED tests to see if it is time to record this accumulated USAGE into the HISTORY table. If the answer is "no", processing continues back to FIG. 3 to analyze the last block of FIG. 3. If, however, the answer is "yes", the block SAVE WEEK-AGO USAGE TEMPORARILY stores the old history from the half-hour of one week ago temporarily for use later in FIG. 6. In the next block of FIG. 5, STORE PRESENT USAGE IN HISTORY TABLE appears which means that the USAGE is stored into the HISTORY table at the positions specified by the HOUR.

The next block in FIG. 5 is POINT TO NEXT HISTORY PERIOD and this relates to the half-hour pointer HOUR so that it points to the next half-hour. Keep in mind that the above decision block of FIG. 5 has determined that one-half hour has elapsed so that we are now at a half-hour crossover time moment. The last step of this sequence of FIG. 5 is to CLEAR USAGE FOR NEXT HALF-HOUR so that USAGE is set to zero and so that hot water usage during this next half-hour will be accurately accumulated in USAGE at the first block of FIG. 5. Finally, the sequence continues back to FIG. 3 and turns to the last block which is COMPUTE DESIRED WATER TEMPERATURE, the details of which are shown in FIG. 6.

Figure 6:
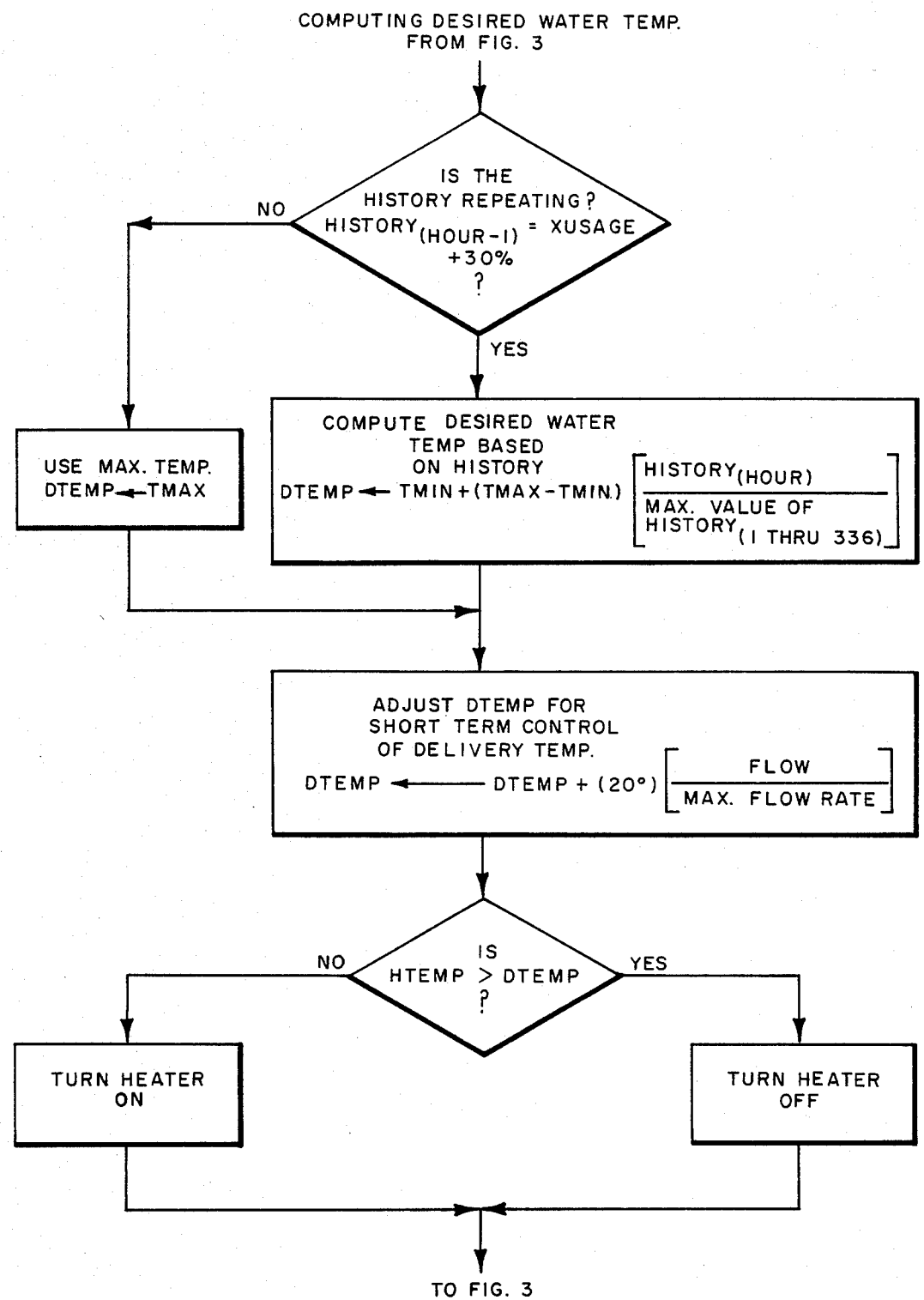
FIG. 6 is a flowchart taken from FIG. 3 and showing the compute desired temperature block in greater detail.

Referring to FIG. 6, the first step therein is a decision block which tests to see if the HISTORY from one-half hour ago is repeating as compared with the HISTORY from one week and one-half hour ago, in other words, the prior consecutive time periods. If the USAGE from one-half hour ago shows a value which differs greatly from the same one week and one-half hour ago, say greater than 30%, then it can be assumed that the HISTORY is not repeating and it would be unwise to set the desired temperature DTEMP, based on this HISTORY. If the USAGE value for one-half hour ago is within the 30% figure or is below the USAGE of one week and one-half hour ago, the differences can be ignored and the DTEMP may be set as based on the HISTORY.

Assuming that the USAGE is fairly close for the half-hour ago and one week and one-half hour ago periods, then the block COMPUTE DESIRED WATER TEMPERATURE BASED ON HISTORY is performed. In this block, the desired temperature DTEMP is set at a value between TMAX and TMIN according to the same consecutive period exactly one week ago. In other words, the objective here is to set the temperature according to the expected demand and with HISTORY apparently repeating, the expected demand would be exactly that as recorded in the same time period one week ago. Thus, the desired temperature, DTEMP is set proportional to the expected USAGE, but within the limits described above.

The actual computation is made with the following formula set forth in the FIG. 6 flowchart. In the formula, DTEMP=TMIN plus TMAX minus TMIN times HISTORY HOUR over MAXIMUM VALUE OF HISTORY (1 through 336).

At this point in the flowchart of FIG. 6, DTEMP has been computed or the maximum temperature DTEMP has been used depending on the circumstances. The next block in the flowchart is ADJUST DTEMP FOR SHORT TERM CONTROL OF DELIVERY TEMPERATURE and this may cause some change at various times throughout the use of DTEMP. By use of this particular block in the control, such control can be constructed for higher efficiency.

In most hot water heating systems designed and used prior to the improved hot water heating system 20 involved herein, the water storage tank of these prior systems will have the water temperature control thereof near the lower portion and near the water inlet of the tank. This means that when hot water is begun to be used, the cold water entering the tank is immediately sensed by the temperature control and the particular heater is immediately turned on. This is a very desirable feature where hot water is used relatively steadily, but if the hot water remains in the tank for a period of time without use, a major problem can develop and that is one known as "stacking".

With "stacking", the water remains non-used in the tank for a period of time and the natural tendency of hot and cold water begins to take effect. The hot water begins to rise toward the top of the tank and the cold water begins to sink to the bottom of the tank. This results in the hot water at the top of the tank becoming higher temperature and the cold water at the bottom of the tank lower temperature, all of which is desired at a maximum in order to save energy.

With the construction of the present hot water heating temperature 20, as indicated by the description in FIG. 1, the preferred embodiment includes the water temperature sensor 32 at the water outlet 26 just as the hot water leaves the top of the water storage tank 22. The water temperature sensing within the lower or along with this water temperature sensor 32, are closely monitored by the processor and control assembly 48 and the assembly is capable of water flow and water non-flow rotation as far as the water flow sensor is concerned.

In operation of the hot water heating system 20 of the present invention with this improvement, the hot water is sensed at the water temperature sensor 32 and when the desired temperature is reached, the heater 42 is turned off by operation of the heating control means, in this case, the fuel control valve 46. Now, assume that hot water is begun to be used by the water distribution system 34 at one or more of the water consumption points 36. The hot water will flow from the water storage tank 22 and if nothing more were provided, the hot water would continue to flow with the water temperature sensor 32 showing hot water use and the cold water which would begin to be admitted at the water inlet 24 would not be detected by this water temperature sensor until virtually all of the hot water is taken from the water storage tank. However, with the present invention improvements, as soon as the hot water begins to flow, particularly with any intensity from the water storage tank 22, the processor and control assembly 48 detects this flow as cold water flow through the water flow sensor 30 ahead of the water storage tank 22 and immediately turns on the fuel control valve 46 admitting the fuel supply 44 to the heater 42 for immediately starting to heat new presently cold water within the water storage tank.

This auxiliary control of the hot water heating will usually only be required for a short period of time since as soon as any cold water is detected at the water temperature sensor 32, that will take care of the usual operation of the heater 42 as a result of this normal control. Furthermore, for light draws, and particularly where the recirculation line 38 and recirculation pump 40 are involved, the recirculation pump will cause the temperature in the water storage tank 22 to homogenize to an extent aiding in the problem and depending on the size of the various equipment, that is, the water storage tank, and the capacity of the recirculation pump. In any event, the processor and control assembly 48 constantly reviews this circumstance and turns the heater 32 "on" or "off" as required to satisfy this particular demand.

Returning to FIG. 6 and the block ADJUST DTEMP FOR SHORT TERM CONTROL OF DELIVERY TEMPERATURE, the cold water flow is constantly monitored to determine the flow thereof into the water storage tank 22 at the present moment. If FLOW is not present, nothing will be done, but if the FLOW is present and is of sufficient magnitude to satisfy the requirements, the DTEMP is increased temporarily and the heater 42 is actuated to begin heating of the cold water entering the water storage tank 22. The actuation of the heater 42 for heating cold water may be done at any instant in this manner and may be cut off at any instant throughout all time periods.

Again, the objective is to increase the probability that the heater 42 will be turned "on" and thereby prevent the water storage tank 22 from filling with cold water by the heater being "off". This, of course, could deplete the system virtually of hot water. This method is needed only during the relatively short time period required for the effects of the cold water coming into the tank to reach the top of the tank where the water temperature sensor is located. The calculation for this block is: DTEMP=DTEMP plus 20 degrees Fahrenheit times FLOW over maximum FLOW.

Finally completing the blocks for the first time through, the final blocks relate to a decision and the decision is whether or not the heater 42 is to be turned "on" or "off" depending on the comparison of HTEMP and DTEMP. The heater 42 is turned "on" if the desired temperature, DTEMP, is greater than the actual delivery temperature, HTEMP. The sequence then proceeds on FIG. 3 back to the beginning returning to the top of FIG. 3 to begin once again.

Although the foregoing gives a full review of the construction and use of the hot water heating system 20 of the present invention, it is believed that a positive example will be helpful. In this example, the unit is installed in a typical motel consisting of 50 units and two water storage tanks 22 connected in parallel as far as water flow is concerned. The water storage tanks 22 are rated at 200,000 BTUs for each 100 gallons of water storage for each. The heated water travels in a 2-inch diameter pipe along the length of the motel which is 150 feet, the pipe branching off into usage points within each room. At the outer end of the motel, the 2-inch pipe narrows to 1 inch and returns to the water storage tank room where a ⅛ horsepower water pump pumps the water into the water heaters for recirculation.

Thus, recirculating the water through the loop and keeping the pipes hot is the purpose of this recirculation. Without recirculation, the pipes would cool to room temperature when no hot water was being used, this normally being a large percentage of the total time. Without recirculation, there could be required a heat-up time for the hot water of 5 to 10 minutes for a 150-foot line and this would be prohibitive and unacceptable to the motel owner.

When the unit is installed for the first time, the parmeters chosen are consecutive time periods of one-half hour groups of consecutive time periods of one week. TMAX and TMIN are set to 145 degrees Fahrenheit and 115 Fahrenheit, respectively. The minimum acceptable temperature in any room is 105 Fahrenheit. It is observed that when the delivery temperature at the water heater, the water storage tanks 22, is 115 degrees Fahrenheit, the temperature in the last room 150 feet away is 105 degrees Fahrenheit.

This drop in temperature is obviously caused by the various heat losses from the pipe containing the hot water. This drop in temperature is also a function of the hot water flow rate. The above observation is made where the flow is primarily caused by the recirculation pump. Note that during a steady, heavy draw or use, the end room temperature 150 feet out will actually increase.

TMAX is set to provide enough stored heat during the heat demand periods so that the motel will not run out of hot water during the heavy demand periods. Assuming there was enough hot water before the unit was installed, TMAX will be set to the thermostat setting of the water storage tanks 22. That is 145 degrees Fahrenheit for TMAX.

Figure 7:
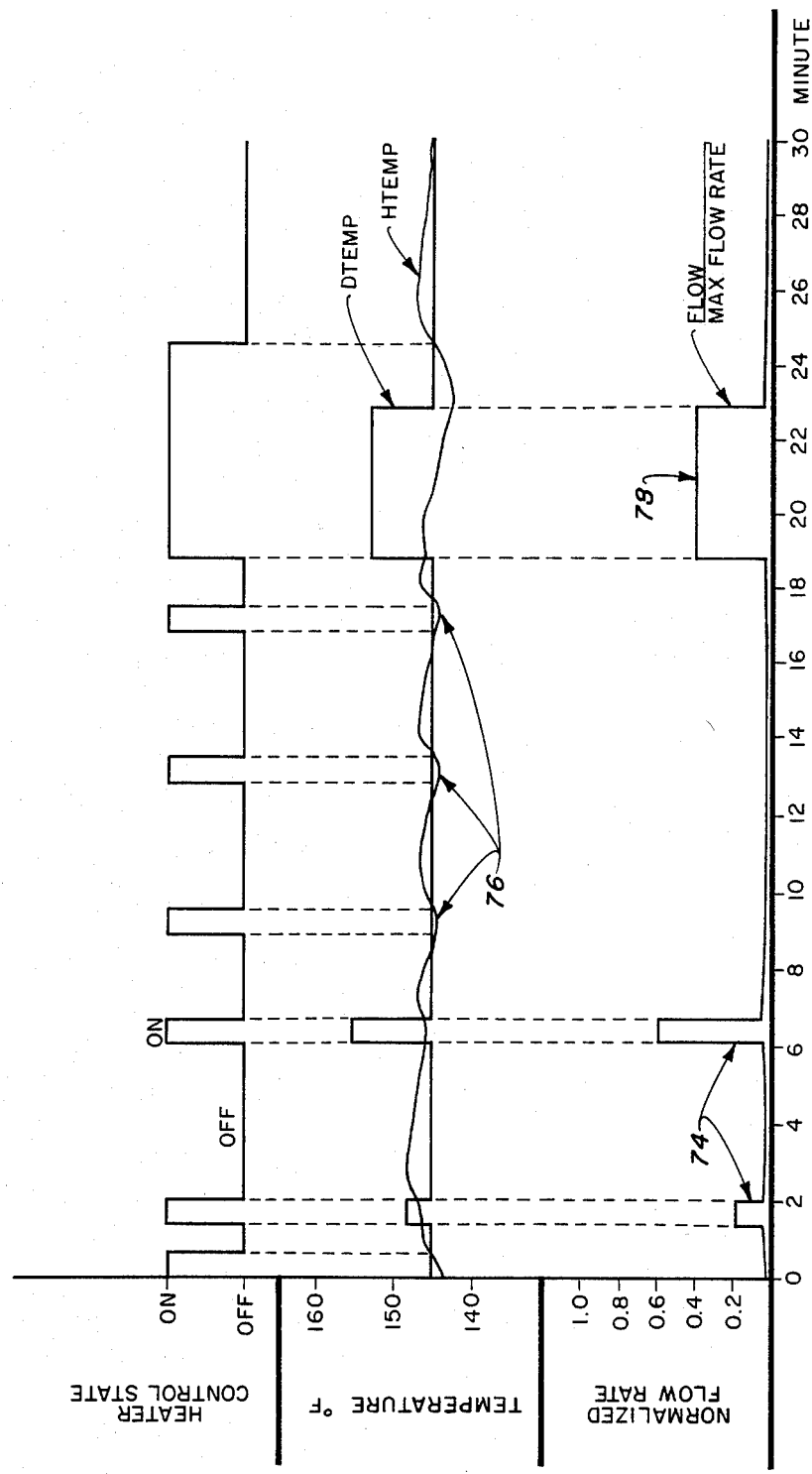
FIG. 7 is a graph showing the heater control, the temperature and the flow rate for the start of a typical initial time period and without an historical background having been established.

When power is applied to the unit, the initialization sequence of FIG. 4 is performed and the HTEMP and FLOW are measured in the second block thereof. FIG. 7 is a graph that shows the primary parameters of the three repeating blocks of FIG. 3 during a half-hour consecutive time period. From the graph of FIG. 7, it can be seen that at the beginning of the half-hour period, the FLOW is zero and the HTEMP is 143 degrees Fahrenheit. It should be noted that the flow rate shown on the graph is actually the normalized flow rate as computed in the second process block of FIG. 6, that is, FLOW over maximum FLOW rate or value.

The numerical value for the first process block of FIG. 5 is: USAGE=zero plus zero times 143 minus 65, where 65 is the cold water temperature in degrees Fahrenheit. The result of this computation is USAGE equals zero.

Figure 8:
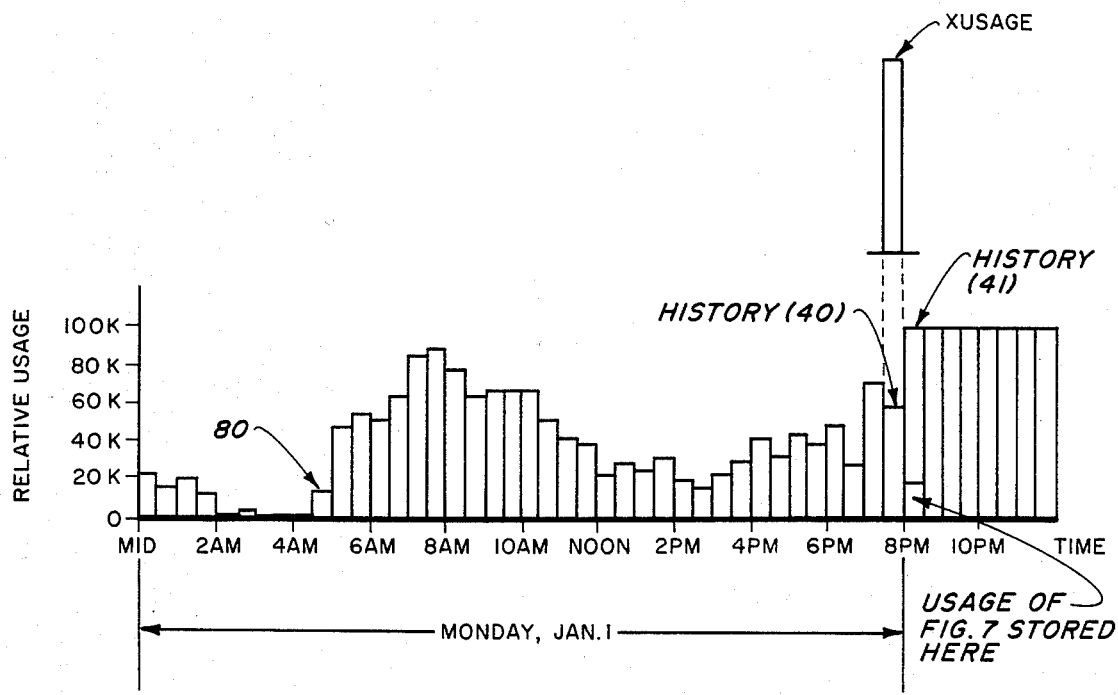
FIG. 8 is a graph showing a 24-hour period of the history table measuring usage for the beginning of the illustrative example.

Since the one-half hour consecutive time period has not elapsed, we proceed to the FIG. 3, COMPUTE DESIRED WATER TEMPERATURE block which is detailed in FIG. 6. Now refer to both FIGS. 6 and 8. FIG. 8 is a bar graph that graphically represents a 24-hour period of the HISTORY table. In this example, the time at this moment is between 8:00 P.M. and 8:30 P.M. For the previous time, before 8:00 P.M., no history has been recorded because this is the first week of operation, and all the bars are at a maximum value of 100K, they being set to this 100K maximum in the initialized sequence of FIG. 4.

Now, in FIG. 6, the first decision block compares HISTORY during the half-hour period of one-half hour ago with USAGE. From FIG. 8, it can be seen that these values are 100K and 60K, respectively. Since these values do not agree within 30%, this being as we would expect since this is the first week of operation and there is no actual week-ago history recorded, DTEMP is set to 145 degrees Fahrenheit.

In the next decision block of FIG. 6, and again referring to FIG. 7, there is no FLOW so that DTEMP=145 plus 20 times zero and that DTEMP remains at 145. This value of DTEMP is shown also in FIG. 7 and can be graphically compared with the actual HTEMP shown in FIG. 7. Assume the HTEMP or actual temperature is less than the desired temperature, in other words, DTEMP is less than desired, the heater 42 is to be turned on as shown at the bottom of FIG. 6 and this state or condition of the heater is also shown in FIG. 7.

This process repeats as per FIG. 3. FIG. 7 shows how the two measured parameters, HTEMP and FLOW change as hot water is used and heat is lost during a typical one-half hour period, and how the processor responds by changing DTEMP and turning the heater 42 "on" and "off". Note how water "demands" or "draws" as indicated at numeral 74 in FIG. 7 causes DTEMP to increase.

The computation is from FIG. 6 and is DTEMP=145 plus 20 times 0.6. DTEMP=157 degrees. This would be for the second of the two arrows 74 in FIG. 7.

Note also arrow 75 of FIG. 7 where the HTEMP is decreasing when there is not any hot water being used. This is due to the heat loss of the hot water throughout the system. This shows that the heater 42 turns on at regular intervals to maintain the desired temperature of the hot water for DTEMP. At arrow 78 in FIG. 7, there is a heavy draw or demand for hot water for an extended period of time. The heater 42 is turned "on", but the delivery temperature decreases, this being due to a large amount of energy being consumed at that time and more than can be supplied by the water heater 42. The heat storage reserve within the system is being depleted, and when the draw or demand stops, the system recovers and the heater turns "off".

During the entire one-half hour consecutive time period, the total energy used is being accumulated for recording in the history table, such recording taking place at the end of the half-hour period. As shown, this is accomplished according to FIG. 5. For example, in the first of the two arrows 74 demands of FIG. 7, the computation is the USAGE=0 plus 0.2 times the quantity 146 minus 65. The USAGE=16.2.

The next time through the sequence of FIG. 3, less than one second later, USAGE=16.2 plus 0.2 times the quantity 146 minus 65, or USAGE=32.4. USAGE will continue to increase whenever there is a demand or draw throughout the one-half hour consecutive time period. Assume for this example that at the end of the one-half hour consecutive time period of FIG. 7, USAGE has the value of 20,000.

In FIG. 5, the block HAS ONE-HALF HOUR ELAPSED is answered "yes". With this being "yes", the following process block HISTORY (41) is moved to XUSAGE. The present USAGE=20,000 and is stored at HISTORY (41) as shown in FIG. 8. In the next two blocks of FIG. 5, HOUR (42) is set and USAGE is reset to 0 in preparation for the sequence to repeat for the next half-hour time period or HISTORY (42).

Figure 9:
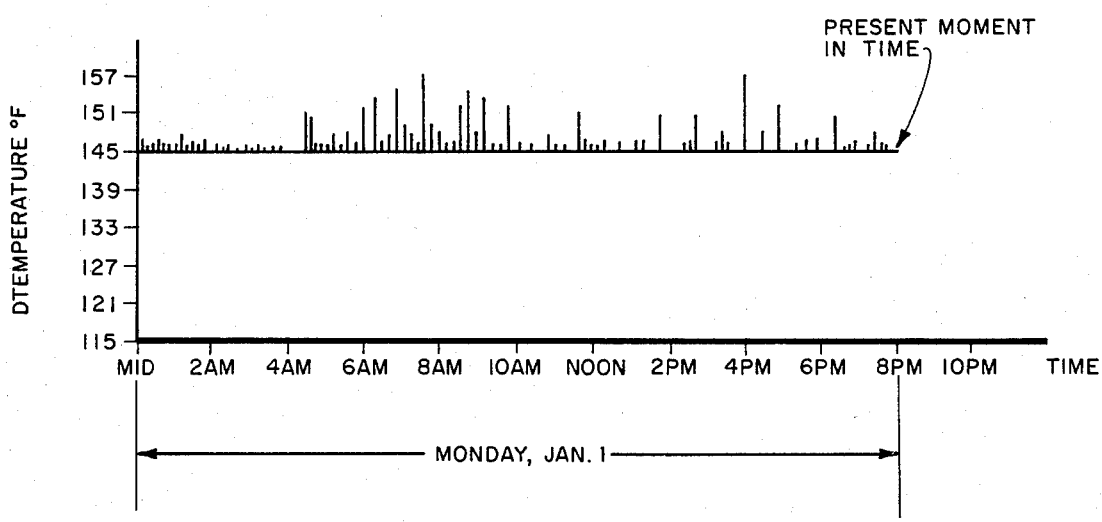
FIG. 9 is a graph showing the initial temperature settings for the period of FIG. 8.

The graph in FIG. 9 shows the desired temperature for HOUR (1 through 40), in other words, the first periods 1 through 40 of the one week overall time period. It remains at 145 degrees Fahrenheit, the maximum temperature, due to the fact that the HISTORY was set to a maximum since there is not yet HISTORY. There are also small spikes above the 145 Fahrenheit line that are called by hot water demands as computed in the ADJUST DTEMP FOR SHORT TERM CONTROL block of FIG. 6.

The pattern of the graph of FIG. 9 will repeat in similar manner for the first seven days, in other words, there being no history yet, DTEMP will remain at maximum or 145 degrees Fahrenheit. After the seventh day, the HISTORY base will be completed and anticipation of demand will begin as illustrated in the graphs of FIGS. 10 and 11.

Figure 10:
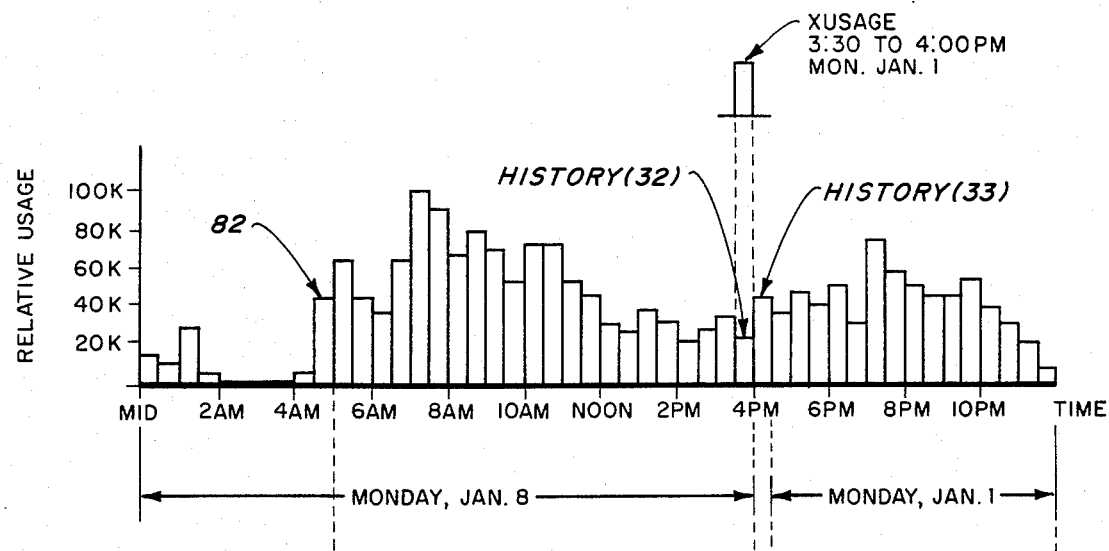
FIGS. 10 and 11 are graphs similar to FIGS. 8 and 9, but after one week of history which gives an historical background for use.
Figure 11:
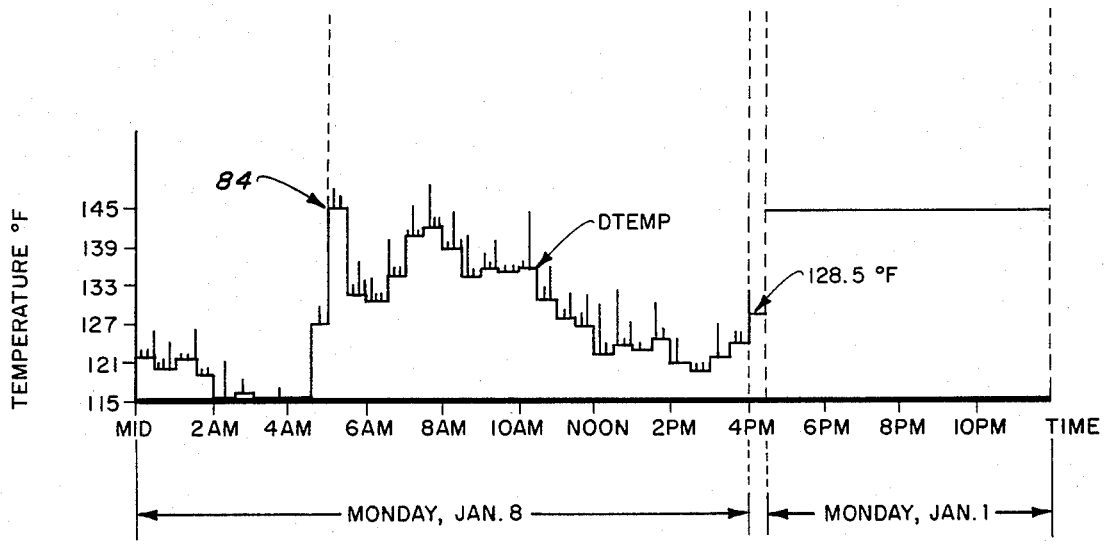

In the example of FIG. 10, there is an existing historical usage data base. The time is between 4:00 P.M. and 4:30 P.M. The method is the same as in the previous example, with the exception that now in the IS THE HISTORY REPEATING block of FIG. 6, the answer is "yes". FIG. 10 shows graphically the comparison of HISTORY (32) and XUSAGE. These agree within 30% so that DTEMP will be set according to HISTORY (33), this being the USAGE for the present one-half hour time period of exactly one week ago, that is, for that time 4:00 P.M. to 4:30 P.M., Monday, January 1.

The numerical computation of the COMPUTE DESIRED WATER TEMPERATURE BASED ON HISTORY block of FIG. 6 is DTEMP=115 plus 145 minus 115 times the quantity 35,000 over 100,000. DTEMP=128.5 degrees Fahrenheit.

Any transient usage will increase DTEMP in the ADJUST DTEMP FOR SHORT TERM CONTROL block that follows, however, the base desired temperature for the one-half hour consecutive time period starting at 4:00 P.M. on Monday, January 8 will be 128.5 degrees Fahrenheit. To summarize, the desired temperature was lower for the period of actual use history from 145 to 128.5 degrees Fahrenheit. When it was observed that the usage pattern was repeating based on the comparison of two one-half hour time periods, the temperature was lowered according to the usage of one week ago.

FIG. 11 shows DTEMP as computed in the above example for Monday, January 8. Note that DTEMP follows the outline of the bar graph of FIG. 8, in other words, the desired temperature for January 8 is determined by the actual usage on January 1. Note also that at arrow 80 of FIG. 8 and arrow 82 of FIG. 10, the comparison of HISTORY (10) and XUSAGE did not agree so that DTEMP was set to 145 degrees Fahrenheit in USE MAXIMUM TEMPERATURE block of FIG. 6. This result is shown in FIG. 11 for the next one-half time period at arrow 84.

The objective of this feature is to keep the temperature high if the usage is not repeated. At the following one-half hour time period, the temperature again repeats so that DTEMP is set according to the history for the following one-half hour consecutive time period. The actual temperature will vary from DTEMP to a degree that depends on the characteristics of the water heater and the amount of hot water usage.

Typically, during a heavy demand period, the water heater will not be able to reach DTEMP as shown in FIG. 7. However, the net effect will be to provide the maximum amount of hot water that the particular heater 42 is capable of delivering. The heater 42 will then "catch up" in the next or later one-half hour time periods and nothing will be lost as long as the hot water temperature does not reduce below 105 degrees Fahrenheit, the minimum desired.

One thing that has not been discussed in the foregoing and that is the occasional situation of "special days". For instance, assume that next Monday is a holiday. That cannot be anticipated and the hot water heating system of the present invention will begin heating that day just as if it were a usual Monday. It has no way of anticipating that use of hot water on that particular day will be quite large due to the celebration of the holiday.

However, by reviewing the general features of the hot water heating system of the present invention, it will be seen that this "special day" will at least be partially accounted for and the remainder not accounted for will be corrected in the week or weeks following. With the "special day" being the Monday, at the start of that Monday at midnight, the first few consecutive time periods, in our case, the first few one-half hours, there may be no complete disclosure to the hot water heating system even though there is a much larger number of people at the facility. In other words, at these initial consecutive time periods, the people will be sleeping.

Starting early in the morning, say 5:00 A.M. or 5:30 A.M., increased water will be used. The first time period or the first two time periods where this extra use can be noted may not be sufficient use of hot water to yet trigger the particular consecutive time period but that will quickly take place. The overall result is that as soon as the excessive use of hot water is noted by the hot water heating system, this being by the history not repeating iself as is checked at the beginning of each consecutive time period, the consecutive time periods at their particular "start" will note the discrepancy and set themselves at maximum temperature.

Thus, from this period on, and throughout a large portion of this "special day", the maximum temperature will be prevailing and more than sufficient water will be provided on the heated basis. At the next week when this Monday again arrives, a large portion of the conscutive one-half hours will have their last week history set at the maximum as a result of this "special day" and the actual use of hot water for this Monday, one week beyond the holiday, will be relatively low. The point is that even though the temperature is not corrected in this week, it will be essentially corrected in the next week. Furthermore, returning to the "special day", the provision of the ADJUST DTEMP FOR SHORT TERM CONTROL OF DELIVERY TEMPERATURE will aid in anticipating this "special day" for aiding in the overall matter.

A further thing to be noted in our discussion of the hot water heating system of the present invention is the fact that during the functioning thereof, the major step for setting up the consecutive time periods, in our example, the one-half hour periods, is to use the overall setting for that particular period one week ago. In other words, only one prior week is used and it is pointed out that under certain circumstances, this may be one week or two weeks or three weeks or any period of consecutive or other weeks, such as a week or two weeks spaced one or two or any number of weeks ago. If only one week is used, any change is quickly noted and made, but if this were two or three weeks, or spaced two or three weeks ago, the change for one week will not be noticed quickly by the hot water heating system. Although the illustration herein makes use of only the one-half hour consecutive time period of one week ago, it should be kept in mind that other periods of two or three weeks or different spacing can be substituted without altering the principles of the present invention.

According to the present invention, therefore, a hot water heating control system is provided for heating hot water at various facilities, such as hotels and motels, and which heats the same on an improved efficient basis. Basically, the hot water is heated using prior history to set present day anticipated use, then using at the present based on that prior use, and actually recording exactly according to present use so that when the next corresponding period arrives comparable to the present period, the present new history or new histories may be used to constantly update hot water heating. Furthermore, if conditions dictate, the hot water heating control system may also have added thereto a particular history repeating concept, that is, at the beginning of each of the series of time periods, the history is tested to see whether or not history is repeating itself in this particular time period, and if history is repeating itself, the normal procedure is continued, but if history is not repeating itself, a particular maximum value is used to be sure of supplying the proper amount of heated hot water until a proper history is completed. Still further, if likewise found to be desired, the hot water heating control system may have added thereto a short term temperature control for use at any time throughout all of the individual time periods. In this short term temperature control, as a result of increased water flow into the hot water heater being detected, the heating of the water is immediately started, rather than waiting for other components to become actionable. In this manner, delays in heating water are avoided, even though they may be of a very short nature, and the efficiency of the hot water heating control system is clearly augmented.

Although a preferred embodiment of the hot water heating control system of the present invention has been illustrated and described herein, it is obvious to those skilled in the art that any of the improvements disclosed herein may be used separately and at least a part of the advantages obtained therefrom. Furthermore, it is not intended to limit the principles of the present invention to the specific embodiment or embodiments shown, but rather such principles should be broadly construed and only modified within the express limitations of the appended claims, including the patent equivalents thereof.

We claim:

1. In a water heater control system for constantly controlling the heating and use of hot water from a water tank of the type having water inlet and outlet means for feeding water to and from the tank, heating means for heating the water at the tank, heating control means for controlling the heating means, adjustable water temperature sensing means for sensing water temperature at the water tank and by controlling the heating control means maintaining the water temperature between determined limits, water distribution means operably connected to the water means for distributing hot water for use; the control system further including: water flow sensing means for sensing an amount of water flow through said water tank; processor and control means operationally connected to said heating control means and said water temperature sensing means and said water flow sensing means for determining the start of a particular time period which is one of a definite group of consecutive time periods and each is a repeat of the same one of preceding groups of time periods, for setting said heating control means and said water temperature sensing means and said water flow sensing means for throughout said particular time period exactly according to the overall averages of actual settings recorded in actual use during at least a certain previous of said same one of a previous group of time periods, for actually recording settings directly exactly as they occur of said heating control means and said water temperature sensing means and said water flow sensing means throughout and according to the water actually used during the particular time period and actual degrees of temperature above a given agreed upon minimum required for maintaining hot water with its use, for repeating for each succeeding of said group of consecutive time periods to the end thereof, for starting and continuing using a next group of consecutive time periods and based on the present actually recorded settings of certain previous groups of consecutive time periods, for continuing with following groups of consecutive time periods and based on actually recorded settings taken at least from certain preceding of said groups of consecutive time periods.

2. In a water heater control system as defined in claim 1 in which said processor and control means is operationally connected for said setting of said heating control means and said water temperature sensing means and said water flow sensing means for the beginning of any time period further includes checking the same settings of a directly preceding time period and that time period in certain of a preceding group or groups of time periods and if comparison of said settings is not within a certain amount, automatically setting for throughout said particular time period said settings to a determined higher limit.

3. In a water heater control system as defined in claim 1 in which said processor and control means is operationally connected for said setting of said heating control means and said water temperature sensing means and said water flow sensing means for the beginning of any time period further includes checking the same settings of a directly preceding time period and that time period in certain of a preceding group or groups of time periods and if comparison of said setting is not within a given higher amount, automatically setting for throughout said particular time period said settings to a determined higher limit.

4. In a water heater control system as defined in claim 1 in which said processor and control means is operationally connected for at any time during any of said time periods said water flow sensing means detects water flow above a certain amount while said heating control means senses said heating means is in non-operable position, said heating means is turned to operable position and retained in said operable position until water flow is no longer above said certain amount.

5. In a water control system as defined in claim 1 in which said water temperature sensing means is positioned at said water outlet means of said water tank for sensing water temperature at said water outlet means; and in which said processor and control means is operationally connected for at any time during any of said time periods said water flow sensing means detects water flow above a certain amount while said heating control means senses said heating means is in non-operable position, said heating means is turned to operable position and retained in said operable position until water flow is no longer above said certain amount.

6. In a water heater control system as defined in claim 1 in which said processor and control means is operationally connected for said setting of said heating control means and said water temperature sensing means and said water flow sensing means for the beginning of any time period further includes checking the same settings of a directly preceding time period and that time period in certain of a preceding group or groups of time periods and if comparison of said settings is not within a certain amount, automatically setting for throughout said particular time period said settings to a determined higher limit; and in which said processor and control means is still further operationally connected for at any time during any of said time periods said water flow sensing means detects water flow above a certain amount while said heating control means senses said heating means is in non-operable position, said heating means is turned to operable position and retained in said operable position until water flow is no longer above said certain amount.

7. In a water heater control system as defined in claim 1 in which said processor and control means is operationally connected for said setting of said heating control means and said water temperature sensing means and said water flow sensing means for the beginning of any time period further includes checking the same settings of a directly preceding time period and that time period in certain of a preceding group or groups of time periods and if comparison of said settings is not within a given higher amount, automatically setting for throughout said particular time period said settings to a determined higher limit; and in which said processor and control means is still further operationally connected for at any time during any of said time periods said water flow sensing means detects water flow above a certain amount while said heating control means senses said heating means is in non-operable position, said heating means is turned to operable position and retained in said operable position until water flow is no longer above said certain amount.

8. In a water heater control system as defined in claim 1 in which said processor and control means is operationally connected for said setting of said heating control means and said water temperature sensing means and said water flow sensing means for the beginning of any time period further includes checking the same settings of a directly preceding time period and that time period in certain of a preceding group or groups of time periods and if comparison of said settings is not within a certain amount, automatically setting throughout said particular time period said settings to a determined higher limit; in which said water temperature sensing means is positioned at said water outlet means of said water tank for sensing water temperature at said water outlet means; and in which said processor and control means is still further operationally connected for at any time during any of said time periods said water flow sensing means detects water flow above a certain amount while said heating control means senses said heating means is in non-operable position, said heating means is turned to operable position and retained in said operable position until water flow is no longer above said certain amount.

9. In a water heater control system as defined in claim 1 in which said processor and control means is operationally connected for said setting of said heating control means and said water temperature sensing means and said water flow sensing means for the beginning of any time period further includes checking the same setting of a directly preceding time period and that time period in certain of a preceding group or groups of time periods and if comparison of said settings is not within a given higher amount, automatically setting for throughout said particular time period said settings to a determined higher limit; and in which said processor and control means is still further operationally connected for at any time during any of said time periods said water flow sensing means detects water flow above a certain amount while said heating control means senses said heating means is in non-operable position, said heating means is turned to operable position and retained in said operable position until water flow is no longer above said certain amount.

10. In a water heater control system as defined in claim 1 in which said group of consecutive time periods are each one week in length.

11. In a water heater control system as defined in claim 1 in which said time periods in each of said groups of consecutive time periods are one-half hour in length.

12. In a water heater control system as defined in claim 1 in which said group of consecutive time periods are each one week in length; and in which said time periods in each of said groups of consecutive time periods are one-half hour in length.

13. In a water heater control system as defined in claim 1 in which said processor and control means is operationally connected for said setting of said heating control means and said water temperature sensing means and said water flow sensing means for the beginning of any time period further includes checking the same settings of a directly preceding time period and that time period in a preceding group of time periods and if comparison of said settings is not within a given higher amount, automatically setting for throughout said particular time period said settings to a determined higher limit; and in which said group of consecutive time periods are each one week in length.

14. In a water heater control system as defined in claim 1 in which said water temperature sensing means is positioned at said water outlet means of said water tank for sensing water temperature at said water outlet means; in which said processor and control means is operationally connected for at any time during any of said time periods said water flow sensing means detects water flow above a certain amount while said heating control means senses said heating means is in non-operable position, said heating means is turned to operable position and retained in said operable position until water flow is no longer above said certain amount; and in which said group of consecutive time periods are one week in length.

15. In a water heater control system as defined in claim 1 in which said processor and control means is operationally connected for said setting of said heating control means and said water temperature sensing means and said water flow sensing means for the beginning of any time period further includes checking the same settings of a directly preceding time period and that time period in a preceding group of time periods and if comparison of said settings is not within a given higher amount, automatically setting for throughout said particular time period said settings to a determined higher limit; in which said processor and control means is still further operationally connected for at any time during any of said time periods said water flow sensing means detects water flow above a certain amount while said heating control means senses said heating means in non-operable position, said heating means is turned to operable position and retained in said operable position until water flow is no longer above said certain amount; and in which said group of consecutive time periods are each one week in length.

16. In a water heater control system as defined in claim 1 in which said processor and control means is operationally connected for said setting of said heating control means and said water temperature sensing means and said water flow sensing means for the beginning of any time period further includes checking the same settings of a directly preceding time period and that time period in certain of a preceding group or groups of time periods and if comparison of said settings is not within a given higher amount, automatically setting for throughout said particular time period said settings to a determined higher limit; in which said processor and control means is still further operationally connected for at any time during any of said time periods said water flow sensing means detects water flow above a certain amount while said heating control means senses said heating means is in non-operable position, said heating means is turned to operable position and retained in said operable position until water flow is no longer above said certain amount; in which said group of consecutive time periods are each one week in length; and in which said time periods in each of said groups of consecutive time periods are one-half hour in length.

17. In a method constantly controlling the heating and use of hot water as provided by a water heating system; the steps of: beginning a particular time period which is one of a definite group of consecutive time periods and each is the repeat of the same one of a preceding group of time periods; at said beginning of said particular time period and to remain throughout said particular time period, setting said water heating system to produce hot water exactly as previously recorded on an averaged basis at least during certain of the same ones of the preceding group or groups of time periods; throughout said particular time period, recording the actual amounts of hot water used as indicated by said water heating system and sufficient in temperature above a determined minimum to substantially maintain hot water with its use; continue in the same manner in order with following of particular time periods until the end of said definite group of consecutive time periods; starting on a next group of time periods and following with other groups of time periods in order and always originally at the beginning of each time period, setting said water heating system to produce hot water exactly according to that particular time period but at least at certain of a preceding group or groups of time periods and then recording actual amounts of hot water used throughout the particular time period.

18. In a method as defined in claim 17 including the further step of: at the beginning of each time period regardless of its particular order, comparing actual amounts of hot water used of a directly preceding time period and that time period in a preceding group or groups of time periods and if the amounts of hot water are not within a certain determined amount, setting the amounts for throughout said particular time period to a determined higher amount.

19. In a method as defined in claim 17 including the further step of: at the beginning of each time period regardless of its particular order, comparing actual amounts of hot water used of a directly preceding time period and that time period in a preceding group or groups of time periods and if the amounts of hot water are not within a given higher amount, setting the amounts for throughout said particular time period to a determined higher amount.

20. In a method as defined in claim 17 in which said method includes the further step of: constantly monitoring water flow and when said flow is above a predetermined amount without heating means for said water heating system being turned operable, turning said heating means to operable until water flow is no longer above said predetermined amount.

21. In a method as defined in claim 17 in which said water temperature for said water heating system is always taken at an outlet side of said water heating system spaced from an inlet side thereof; and in which said method includes the further step of: constantly monitoring water flow and when said flow is above a predetermined amount without heating means for said water heating system being operable, turning said heating means to operable until water flow is no longer above said predetermined amount.

22. In a method as defined in claim 17 including the further step of: at the beginning of each time period regardless of its particular order, comparing actual amounts of hot water used of a directly preceding time period and that time period in a preceding group or groups of time periods and if the amounts of hot water are not within a certain determined amount, setting the amounts for throughout said particular time period to a determined higher amount; and in which said method includes the further step of: constantly monitoring water flow and when said flow is above a predetermined amount without heating means for said water heating system being turned operable, turning said heating means to operable until water flow is no longer above said predetermined amount.

23. In a method as defined in claim 17 including the further step of: at the beginning of each time period regardless of its particular order, comparing actual amounts of hot water used of a directly preceding time period and that time period in a preceding group or groups of time periods and if the amounts of hot water are not within a given higher amount, setting the amounts for throughout said particular time period to a determined higher amount; and in which said method includes the further step of: constantly monitoring water flow and when said flow is above a predetermined amount without heating means for said water heating system being turned operable, turning said heating means to operable until water flow is no longer above said predetermined amount.

24. In a method as defined in claim 17 including the further step of: at the beginning of each time period regardless of its particular order, comparing actual amounts of hot water used of a directly preceding time period and that time period in a preceding group or groups of time periods and if the amounts of hot water are not within a certain determined amount, setting the amounts for throughout said particular time period to a determined higher amount; in which said water temperature for said water heating system is always taken at an outlet side of said water heating system spaced from an inlet side thereof; and in which said method includes the further step of: constantly monitoring water flow and when said flow is above a predetermined amount without heating means for said water heating system being operable, turning said heating means to operable until water flow is no longer above said predetermined amount.

25. In a method as defined in claim 17 including the further step of: at the beginning of each time period regardless of particular order, comparing actual amounts of hot water used of a directly preceding time period and that time period in a preceding group or groups of time periods and if the amounts of hot water are not within a given higher amount, setting the amounts for throughout said particular time period to a determined higher amount; in which said water temperature for said water heating system is always taken at an outlet side of said water heating system spaced from an inlet side thereof; and in which said method includes the further step of: constantly monitoring water flow and when said flow is above a predetermined amount without heating means for said water heating system being operable, turning said heating means to operable until water flow is no longer above said predetermined amount.

26. In a method as defined in claim 17 in which each of said groups of consecutive time periods 27. In a method as defined in claim 17 in which each of said time periods of each of said groups equals one-half hour.

28. In a method as defined in claim 17 in which each of said groups of consecutive time periods equals one week; and in which each of said time periods of each of said groups equals one-half hour.

29. In a method as claimed in claim 17 including the further step of: at the beginning of each time period regardless of its particular order, comparing actual amounts of hot water used of a directly preceding time period and that time period in a directly preceding group of time periods and if the amounts of hot water are not within a given higher amount, setting the amounts for throughout said particular time period to a determined higher amount; and in which each of said groups of consecutive time periods equals one week.

30. In a method as defined in claim 17 in which said water temperature for said water heating system is always taken at an outlet side of said water heating system spaced from an inlet side thereof; in which said method includes the further step of: constantly monitoring water flow and when said flow is above a predetermined amount without heating means for said water heating system being operable, turning said heating means to operable until water flow is no longer above said predetermined amount; and in which each of said groups of consecutive time periods equals one week.

31. In a method as defined in claim 17 including the further step of: at the beginning of each time period regardless of particular order, comparing actual amounts of hot water used of a directly preceding time period and that time period in a directly preceding group of time periods and if the amounts of hot water are not within a given higher amount, setting the amounts for throughout said particular time period to a determined higher amount; in which said water temperature for said water heating system is always taken at an outlet side of said water heating system spaced from an inlet side thereof; in which said method includes the further step of: constantly monitoring water flow and when said flow is above a predetermined amount without heating means for said water heating system being operable, turning said heating means to operable until water flow is no longer above said predetermined amount; and in which each of said groups of consecutive time periods equals one week.

32. In a method as defined in claim 17 including the further step of: at the beginning of each time period regardless of particular order, comparing actual amounts of hot water used of a directly preceding time period and that time period in a preceding group or groups of time periods and if the amounts of hot water are not within a given higher amount, setting the amounts for throughout said particular time period to a determined higher amount; in which said water temperature for said water heating system is always taken at an outlet side of said water heating system spaced from an inlet side thereof; in which said method includes the further step of: constantly monitoring water flow and when said flow is above a predetermined amount without heating means for said water heating system being operable, turning said heating means to operable until water flow is no longer above said predetermined amount; in which each of said groups of consecutive time periods equals one week; and in which each of said time periods of each of said groups equals one-half hour.

* * * * *

UNITED STATES PATENT AND TRADEMARK OFFICE
CERTIFICATE OF CORRECTION

PATENT NO. : 4,522,333

DATED : June 11, 1985

INVENTOR(S) : Frederick Blau, Jr.; Johm M. Gross; Tom R. Vandermeyden

It is certified that error appears in the above-identified patent and that said Letters Patent is hereby corrected as shown below:

--Column 19, line 68, insert equals one week. after "periods"

Signed and Sealed this

Twenty-ninth Day of October 1985

[SEAL]

Attest:

DONALD J. QUIGG

Attesting Officer

Commissioner of Patents and
Trademarks—Designate